United States Patent
Neuss

[15] 3,676,438
[45] July 11, 1972

[54] DESACETYLARANOTIN

[72] Inventor: Norbert Neuss, Indianapolis, Ind.

[73] Assignee: Eli Lilly and Company, Indianapolis, Ind.

[22] Filed: Oct. 15, 1969

[21] Appl. No.: 866,497

[52] U.S. Cl. .................................260/243 R, 424/246
[51] Int. Cl. .....................................................C07d 93/20
[58] Field of Search.....................................260/243, 243 R

[56] References Cited

OTHER PUBLICATIONS

Nagarajan et al., J. Am. Chem. Soc., vol. 90, pp. 2980-2 (1968)

Primary Examiner—John M. Ford
Attorney—Everet F. Smith and James L. Rowe

[57] ABSTRACT

Desacetylaranotin having anti-viral activity.

1 Claim, 1 Drawing Figure

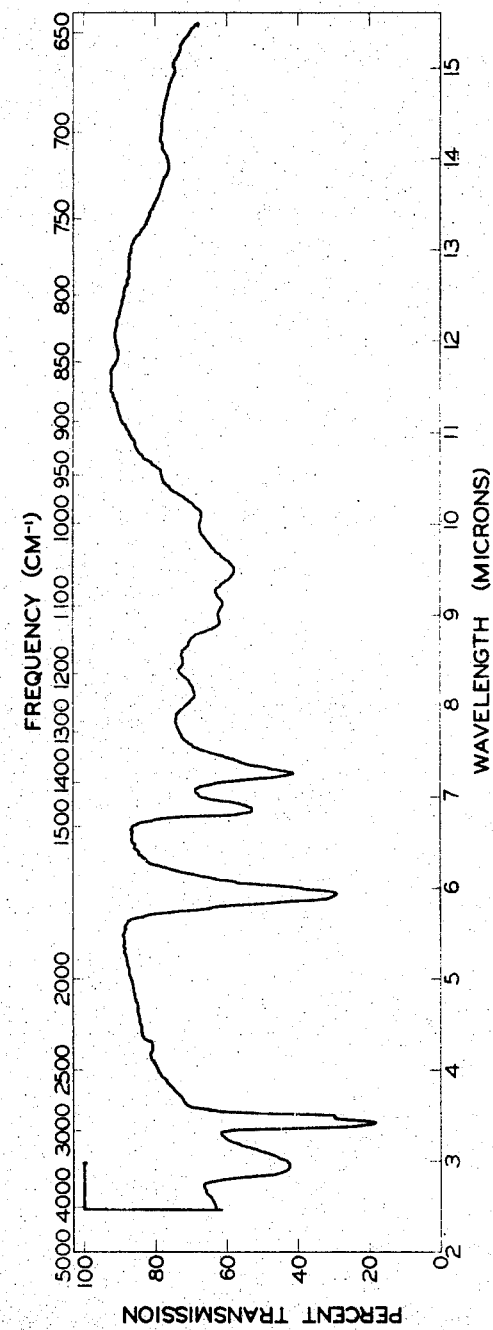
INVENTOR
NORBERT NEUSS

DESACETYLARANOTIN

BACKGROUND OF THE INVENTION

Aranotin is a metabolite of the fungus *Arachniotus aureus* and is structurally related to other sulfur-containing diketopiperazines, such as gliotoxin and sporidesmins, derived from fungi. The structures of aranotin, of its monoacetyl product, acetylaranotin, and of its dethio-methylmercapto products, as well as of various desulfurized derivatives, are described by Nagarajan et al., *J. Am. Chem. Soc.* 90, 2980 (1968); Neuss et al., *Tetrahedron Letters No.* 42, 4467–4471 (1968); and Nagarajan et al., *J. Am. Chem. Soc.* 90, 6518 (1968). Aranotin has anti-viral activity in vitro.

SUMMARY OF THE INVENTION

This invention provides a novel derivative of aranotin, desacetylaranotin, represented by the following formula:

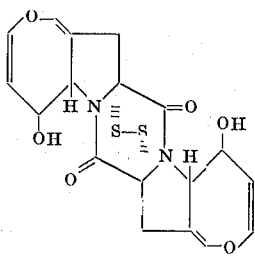

Desacetylaranotin is prepared by the hydrolysis of acetylaranotin (described in *J. Am. Chem. Soc.* 90, 2980 (1968) in acidic alcohol. The preparation is carried out as follows:

PREPARATION OF DESACETYLARANOTIN

50 Mg. of acetylaranotin were dissolved in 50 ml. of methanolic hydrochloric acid solution prepared by adding 1 ml. of 36 percent aqueous hydrochloric acid to 100 ml. of anhydrous methanol. The solution was allowed to stand at room temperature for about 7 hours after which time it was filtered. Evaporation of the filtrate to dryness yielded 30 mg. of a dry powder consisting essentially of desactylaranotin. Chromatography of the residue over silica using an ethylacetate-benzene solvent mixture (4:1) yielded purified desacetylaranotin. Desacetylaranotin is a white crystalline solid which decomposes above 280° C. without a definite melting point. Thin layer chromatography shows a single spot.

The infra-red spectrum of desacetylaranotin in a mineral oil mull is given in FIG. 1. The spectrum shows characteristic peaks at 2.97A, 3.45A, 5.95A, 6.86A, and 7.37A.

The ability of desacetylaranotin to suppress the growth of viruses in vitro is readily demonstrated by using a plaque suppression test similar to that described by Siminoff, *Applied Microbiology*, 9 (1), 66–72 (1961). The test proceeds as follows. The tests are carried out using rectangular glass boxes measuring 7½ × 15 × 1½ inches, made of pieces of double strength plate glass sealed together with silicone rubber cement. The glass boxes are covered with a glass lid and before use are sterilized by dry heat at a temperature of about 300° C. An approximately $10^6$/ml. BS-C-1 (serial culture of Cercopithecus monkey kidney) cell suspension is made in a medium composed of medium 199 together with 5 percent calf serum, 150 units/ml. of penicillin, and 150 mcg./ml. of streptomycin. Two-hundred-fifty milliliters of the suspension are added to each sterilized glass box, and the boxes are incubated at about 37° C. for about 96 hours in a level position. After incubation, the medium is carefully drawn off leaving a monolayer of cells undisturbed on the glass. The cells are then infected by gently adding to each box about 100 ml. of a suspension of the particular virus in medium 199. Polio Type I (Mahoney strain) and Polio Type III (Saukett strain) were used.

After allowing a time of from about 1 to about 3 hours for adsorption of the virus on the cells, the infecting medium is removed from the plate. A mixture of 75 ml. of double strength medium 199 with calf serum, penicillin, and streptomycin and 75 ml. of double strength agar (Difco purified) solution (2 percent) at 50° C. is poured over the virus-infected cell monolayer in each box and allowed to solidify at a level attitude. Filter paper disks are dipped in solutions of substances to be tested, dried in a vacuum oven at no higher than 37° C. for about 1 hour and then placed on the surface of the agar in the boxes. The boxes are incubated at about 37°C. for about 84 hours, the boxes are flooded with aqueous 10 percent formalin-2 percent sodium acetate solution, and the agar is floated off with water. The cells remaining are stained with Wright's stain. Toxicity, anti-viral activity, and the microscopic appearance of the cells are recorded following the procedure of Hermann et al., *Proc. Soc. Exp. Biol. and Med.*, 103, 625 (1960).

Plaques are seen in those areas of the plate where the virus has infected and reproduced in the cells. Zones of toxicity are observed and the diameter thereof measured in millimeters when the test compound kills the cells under and around the filter paper disk. Anti-viral activity of the test compounds is detected by observing the absence of plaques and a heavier growth of cells in a zone under and around the filter paper disk, the diameter of this zone being measured in millimeters.

Where the amount of anti-viral agent is limited, cutouts of active agent on a paper chromatogram can be used in place of the filter paper disc or the procedure can be modified by overlaying a thin-layer chromatographic plate on the infected agar slant.

The cells in a zone of activity are examined with a microscope to determine the presence and degree of drug and/or virus damage. The staining is graded 1+, 2+, 3+, 4+, and negative:

4+. Dark stained areas which, upon microscopic examination, show healthy cells with no visible virus or drug damage;

3+. Less darkly stained areas that show no virus damage but appear less healthy;

2+. Areas showing healthy cells with a moderate amount of virus breakthrough;

1+. Areas showing healthy cells with a greater virus breakthrough;

−. No viable cells.

Table 1 which follows sets forth the results of testing desacetylaranotin against Polio I and Polio III. In the table, column 1 gives the rate in terms of mcg./ml. at which the compound was applied to the filter paper disks; column 2, the diameter in millimeters of zones of cell toxicity; column 3 the diameter in millimeters of the zones of virus inhibition; and column 4, grading of the stained areas.

TABLE I

Activity of Desacetylaranotin Against Polio I and Polio III

| Rate in mcg./ml. | Diameter of zone of cell toxicity in mm. | | Diameter of zone of virus inhibition in mm. | | Grade of stained area | |
|---|---|---|---|---|---|---|
| | Polio I | Polio III | Polio I | Polio III | Polio I | Polio III |
| 250 | 7 | 7 | 26 | 30 | 4+ | 4+ |
| 125 | − | − | 23 | 28 | 4+ | 4+ |
| 62 | − | − | 20 | 23 | 4+ | 4+ |
| 31 | − | − | 15 | 18 | 4+ | 4+ |
| 15 | − | − | 9 | 15 | 4+ | 4+ |

Desacetylaranotin is also active against four Rhino-viruses in tissue culture using the above procedures to determine anti-viral activity.

The use of desacetylaranotin in combating viral infections is illustrated by its ability to cure mice infected with Coxsackie A21 (Coe) virus. This virus was isolated by Lanette et al., *Am. J. Hyg.* 68, 2727 (1959), from human patients with mild respiratory illness. In mice, the virus produces muscle degeneration and flaccid paralysis as well as respiratory involvement. The mouse-adapted Coxsackie A21 virus employed was in the form of a 1:10 dilution of the supernate of a 10 percent mouse gluteal muscle (obtained from infected mice) suspension. Desacetylaranotin was in the form of a 3-spot mixture as furnished by preparation 1, prior to final purification but containing desacetylaranotin as its predominant anti-viral agent (against Coxsackie virus). The compound was administered to the mice as a suspension in 0.25 ml. of a sterile water (permissibly containing up to 3 percent of a nonionic surfactant) at 0.125 mg./kg. intraperitoneally. The mice employed were SPF white Swiss mice weighing 11–13 grams. Ten mice were used for each drug level, and 3 to 5 groups of 10 mice each were used as controls. In this procedure, the control mice usually die on the 5th to 8th day after infection, and animals alive through the 10th day are considered survivors if free of paralysis.

Table 2 which follows gives the results of the above experiment. In the table column 1 gives the treatment, column 2 the survival index as determined by the method of Redman et al., *Antimicrobial Agents* and *Chemotherapy* – 1966, p. 497, column 3 the mean day of death, and column 4 the number of survivors over the total number of mice in the treated group.

The $ED_{50}$ of desacetylaranotin determined from the above data is about 0.125 mg./kg. of mouse weight.

Desacetylaranotin produces anti-viral blood levels upon both oral and intraperitoneal administration to mice in contrast to aranotin which does not give blood levels when administered by the oral route.

TABLE II

| Treatment | Survival Index | Mean Day of Death | No. of Survivors /Total No. |
| --- | --- | --- | --- |
| Desacetylaranotin 4.30 .125 mg./kg.;IP | | 6.4 | 5/10 |
| Control 1.83 | | 5.9 | 0/30 |

I claim:
1. Desacetylaranotin represented by the following structure:

* * * * *